(12) United States Patent
Li et al.

(10) Patent No.: US 6,699,604 B1
(45) Date of Patent: Mar. 2, 2004

(54) PROTECTIVE COATING INCLUDING POROUS SILICON NITRIDE MATRIX AND NOBLE METAL

(75) Inventors: Chien-Wei Li, Livingston, NJ (US); Alexander S. Kozlov, Wharton, NJ (US)

(73) Assignee: Honeywell International Inc., Morristown, NJ (US)

( * ) Notice: Subject to any disclaimer, the term of this patent is extended or adjusted under 35 U.S.C. 154(b) by 344 days.

(21) Appl. No.: 09/598,015

(22) Filed: Jun. 20, 2000

(51) Int. Cl.[7] .................................. B32B 9/00
(52) U.S. Cl. ................ 428/698; 428/699; 428/704; 428/702; 428/446; 428/457; 428/469; 428/472; 428/364; 428/375; 428/304.4; 428/306.6; 428/307.3; 428/307.7; 428/311.11; 428/311.51; 428/312.2; 428/312.6; 428/196; 428/209; 428/210; 427/255.12; 427/255.18; 427/269; 427/258; 427/344; 427/404; 427/443.1; 427/443.2; 156/89.27
(58) Field of Search .................. 428/688, 689, 428/704, 698, 446, 699, 457, 469, 702, 472, 357, 364, 375, 304.4, 306.6, 307.3, 307.7, 311.11, 311.51, 312.2, 312.6, 196, 209, 210; 427/243, 255.11, 255.12, 258, 255.18, 269, 287, 404, 430.1, 443.1, 443.2

(56) References Cited

U.S. PATENT DOCUMENTS

| | | |
|---|---|---|
| 4,421,525 A | 12/1983 | Sarin et al. |
| 4,643,858 A | 2/1987 | Mizutani |
| 5,021,372 A | 6/1991 | Pyzik et al. |
| 5,198,152 A | 3/1993 | Liimatta et al. |
| 5,227,199 A * | 7/1993 | Hazlebeck et al. |
| 5,231,061 A | 7/1993 | Devore |
| 5,371,050 A | 12/1994 | Belitskus et al. |
| 5,716,720 A | 2/1998 | Murphy |
| 5,728,638 A * | 3/1998 | Strange et al. |
| 5,756,207 A | 5/1998 | Clough et al. |
| 5,942,205 A | 8/1999 | Murata et al. |
| 6,013,238 A | 1/2000 | Murata et al. |
| 6,159,553 A | 12/2000 | Li et al. |

FOREIGN PATENT DOCUMENTS

| | | |
|---|---|---|
| JP | 03 247572 A | 11/1991 |
| JP | 06 287095 A | 10/1994 |

* cited by examiner

Primary Examiner—Deborah Jones
Assistant Examiner—Wendy Boss
(74) Attorney, Agent, or Firm—Oral Caglar, Esq.

(57) ABSTRACT

A turbomachine component includes a silicon nitride substrate and a protective coating on the substrate. The protective coating includes a porous silicon nitride matrix and a noble metal infiltrated in the porous silicon nitride matrix.

6 Claims, 3 Drawing Sheets

PROTECTIVE COATING INCLUDING POROUS SILICON NITRIDE MATRIX AND NOBLE METAL

BACKGROUND OF THE INVENTION

The present invention relates to turbomachine components and ceramic components made of silicon nitride. More specifically, the present invention relates to protective coatings for such components.

It is desirable to make certain gas turbine components of sintered silicon nitride ceramic. Silicon nitride blades, rotors and nozzles exhibit excellent mechanical and thermal properties, even when employed in flow streams at temperatures above 1200° C. Moreover, the silicon nitride can counteract the adverse effects of oxidation and water vapor. Thus, turbine blades, rotors, and nozzles made partly or entirely of silicon nitride allow the gas turbines to operate at high temperatures.

It is also desirable to increase the gas turbine operating temperature beyond 1200° C. Increasing the operating temperature would boost performance, improve efficiency and reduce pollutant emissions.

For operating temperatures approaching 1480° C., however, even silicon nitride blades, rotors and nozzles can be adversely effected by oxidation and water vapor present in the flow stream. Oxidation can cause the silicon nitride to become brittle and fracture. Consequently, a component could fail.

Moreover, the silicon nitride components can be chipped or fractured by foreign objects such as carbon or metallic particles in the flow stream. Thus, impact by the foreign particles can also cause the components to fail.

It would be desirable to increase impact and oxidation resistance of silicon nitride components at operating temperatures beyond 1200° C.

SUMMARY OF THE INVENTION

According to one aspect of the present invention, a component comprises a silicon nitride substrate; a porous silicon nitride matrix on the silicon nitride substrate, the porous silicon nitride matrix having a whisker-like morphology; and a noble metal infiltrated in the porous silicon nitride matrix.

DETAILED DESCRIPTION OF THE INVENTION

Figure 1:
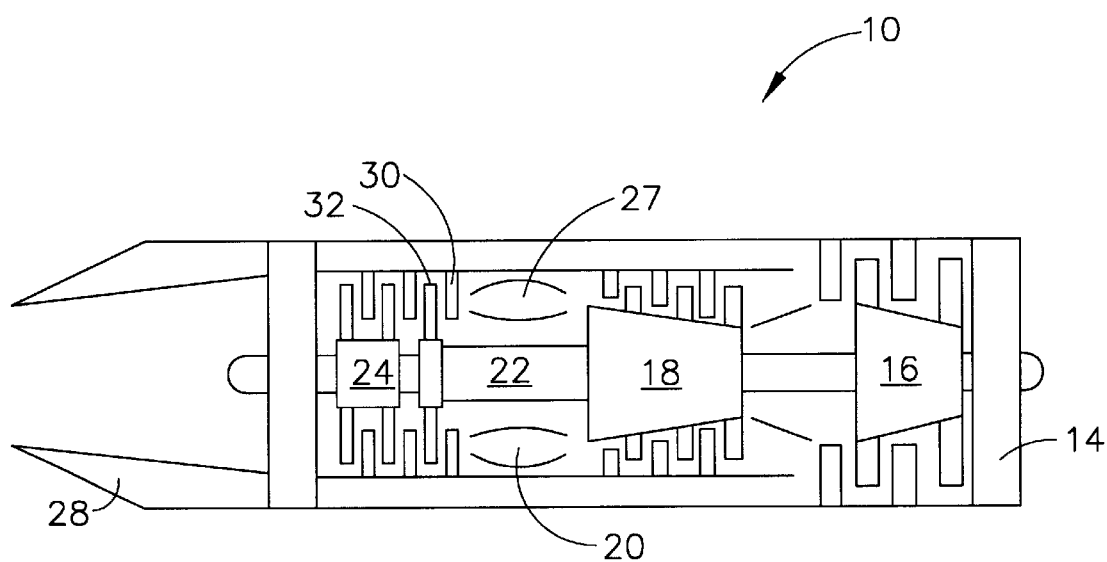
FIG. 1 is an illustration of a gas turbine engine including certain components formed in accordance with the present invention.

Referring to FIG. 1, a gas turbine engine 10 includes, in serial flow relation from inlet to exhaust, an inlet frame 14, a two stage low pressure compressor ("LPC") 16, a three stage high pressure compressor ("HPC") 18 and a combustor 20. The engine 10 further includes a single stage high pressure turbine ("HPT") 22, a two stage low pressure turbine ("LPT") 24, a turbine frame 26, and an exhaust nozzle 28. Each turbine 22 and 24 includes a plurality of stationary turbine vanes 30 and a plurality of rotating turbine blades 32. During operation of the turbine engine 10, a stream of air enters the engine assembly 10 through the inlet 14 and travels through the open interior 27 of the engine. As the stream passes through the engine 10, high temperature combustion effluent gases mix with the stream before being expelled by the exhaust nozzle 28.

Figure 2:
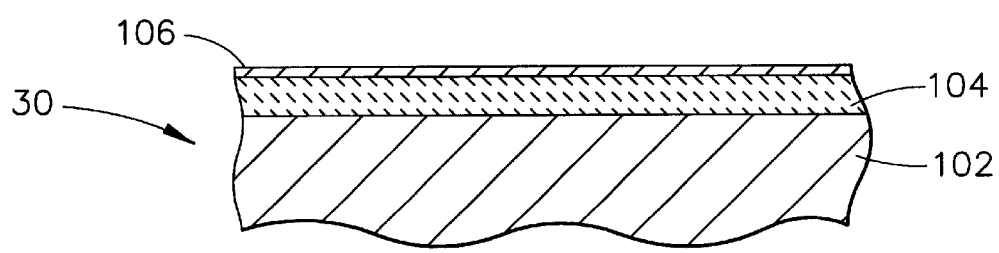
FIG. 2 is an illustration a component having a substrate and a protective coating on the substrate.

FIG. 2 shows a portion of a turbine vane 30 in greater detail. The turbine vane 30 includes a substrate 102 and a protective coating 104 applied to an outer surface of the substrate 102. The substrate 102 may be made of a dense silicon nitride. The protective coating 104 includes a porous beta silicon nitride matrix having a whisker-like morphology, a refractory metal oxide coating on the silicon nitride whiskers, and a noble metal infiltrated in the porous silicon nitride matrix. A top layer 106 of the noble metal may cover the protective coating 104. The protective coating 104 and the top layer 106 provide high impact resistance due to high fracture toughness and an ability to absorb impact energy. Thus, the protective coating 104 and top layer 106 increase resistance to impact of foreign particles. The porous silicon nitride matrix also acts as a strain absorption compliant layer so that thermal expansion mismatch between the noble metal and the silicon nitride substrate does not create significant stress in the protective coating 104. The morphology of the silicon nitride whiskers also enhance bonding to the noble metal. The protective coating 104 does not substantially increase the weight of the turbine vane 30. The noble metal provides protection against oxidation, even when the turbine vane 30 is subjected to temperatures exceeding 1200° C. Moreover, the noble metal seals the voids in the porous silicon nitride matrix and prevents the silicon nitride substrate 102 from reacting with hostile gases in the turbine engine. A noble metal such as platinum has a high emissivity and, therefore, effectively reflects radiation into the air stream. Thus, thermal efficiency of the gas turbine engine is improved. Additionally, the platinum is compliant, further increases fracture toughness and further reduces particle impact damage. The refractory metal oxide functions in part as a barrier that prevents a noble metal such as platinum from reacting with the porous silicon nitride matrix at high temperatures (platinum may react with silicon nitride to form platinum silicide, which has a low melting temperature).

Figure 3A:
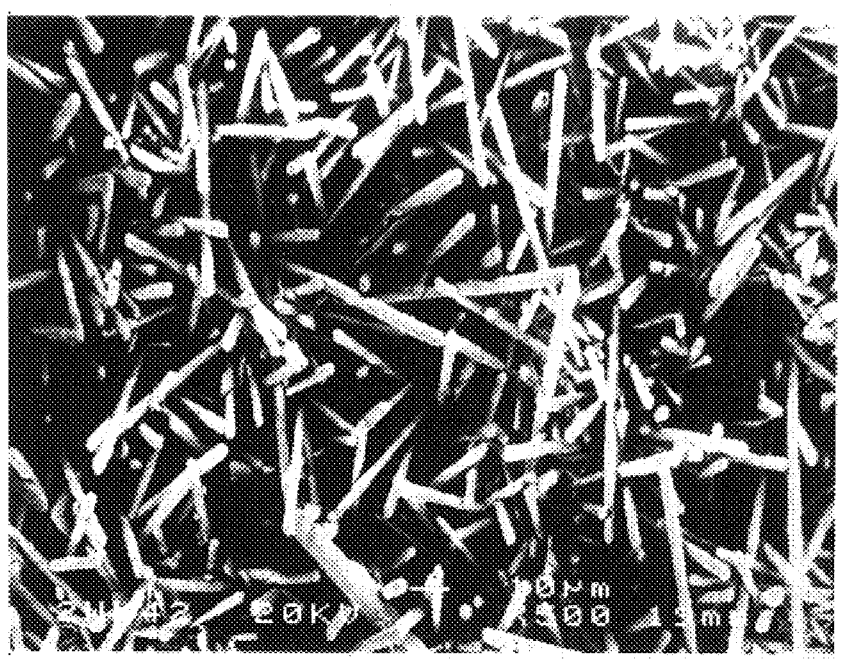
FIGS. 3a, 3b and 3c are photographs of the microstructure of the protective coating during different phases of formation.
Figure 3B:
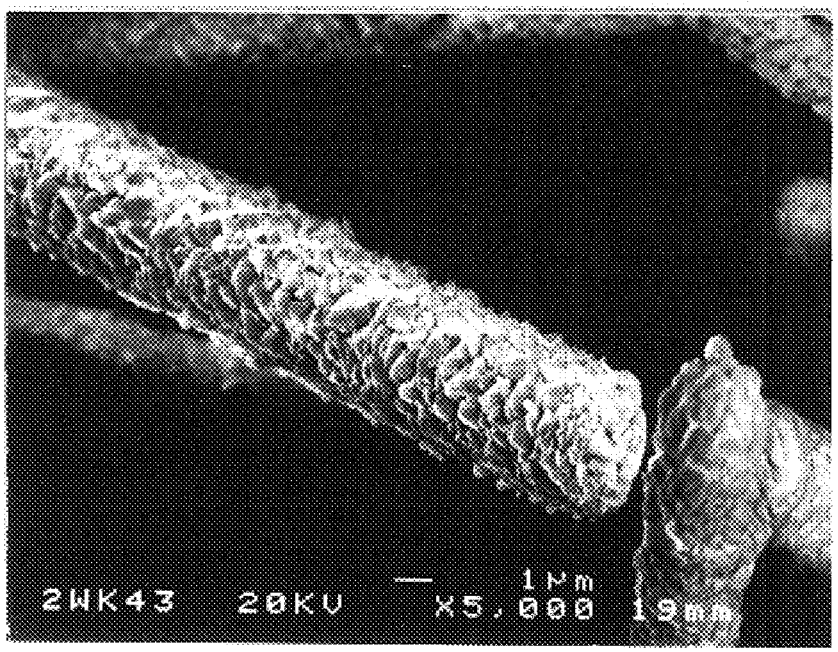
Figure 3C:
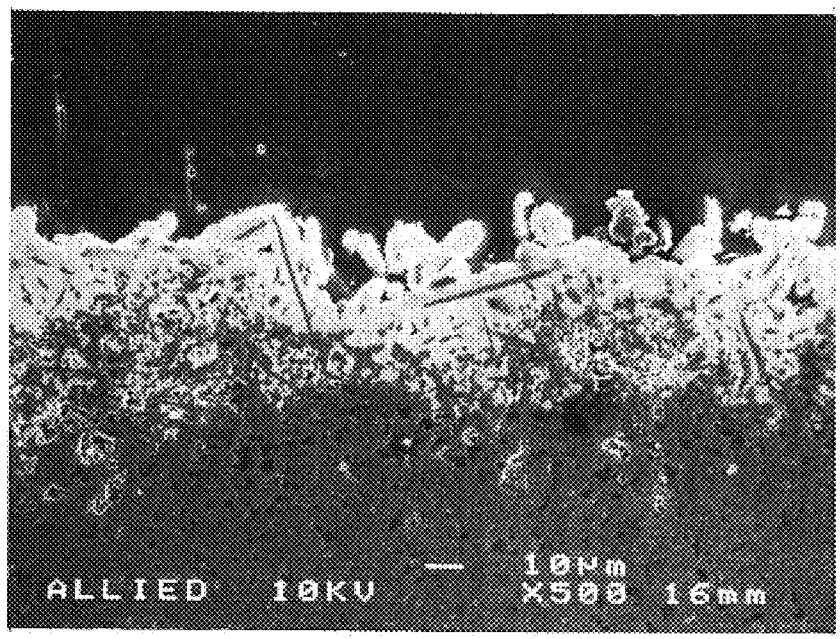

FIGS. 3a, 3b and 3c show the microstructure of the protective coating 104 during different stages of formation. FIG. 3a shows only the porous silicon matrix. Preferably, the porous silicon matrix is a fibrous, layer of beta silicon nitride. The silicon nitride whiskers are acicular and interlocked; the whiskers have a thickness in the range of about 0.5 microns to about 50 microns and, preferably, about 1.0 micron to 10.0 microns. Aspect ratio (that is, the ratio of length to width) of the silicon nitride whiskers is between 5 and 200. The density of the porous silicon nitride matrix is about 70–90%. That is, the porosity of the porous silicon nitride matrix is between 10% and 30%. The whisker orientation is isotropic; that is, the whiskers do not have a preferred orientation.

FIG. 3b shows the refractory metal oxide coating on the silicon nitride whiskers. The refractory metal oxide has a thermal expansion coefficient that matches the coefficient of expansion of the silicon nitride, that is, about $3.5 \times 10^{-6}$. Preferably, the refractory metal oxide is a dense tantalum oxide ($Ta_2O_5$). A coating of tantalum oxide may have a thickness between about 0.1 microns and 50.0 microns and, preferably, between about 0.5 microns and 10.0 microns. Alternatively, oxide compounds having a thermal match (i.e., in a range of $2.5\sim5.0\times10^{-6}$) may be substituted for the tantalum oxide. Such compounds may include oxides of molybdenum (Mo), hafninum (Hf), niobium (Nb), titanium (Ti), nickel (Ni), tungsten (W), aluminum (Al), magnesium (Mg), strontium (Sr) and zirconium (Zr).

FIG. 3c shows the noble metal infiltrated in the porous silicon nitride matrix. The noble metal fills spaces between the silicon nitride whiskers. After the noble metal has infiltrated the porous silicon nitride matrix, the protective layer has an overall density of nearly 100%. The noble metal is relatively ductile. A noble metal such as platinum is preferred for its high emissivity. However, the noble metal is not limited to platinum. Other noble metals that may be used include, without limitation, rhodium and alloys containing platinum or rhodium.

Figure 4:
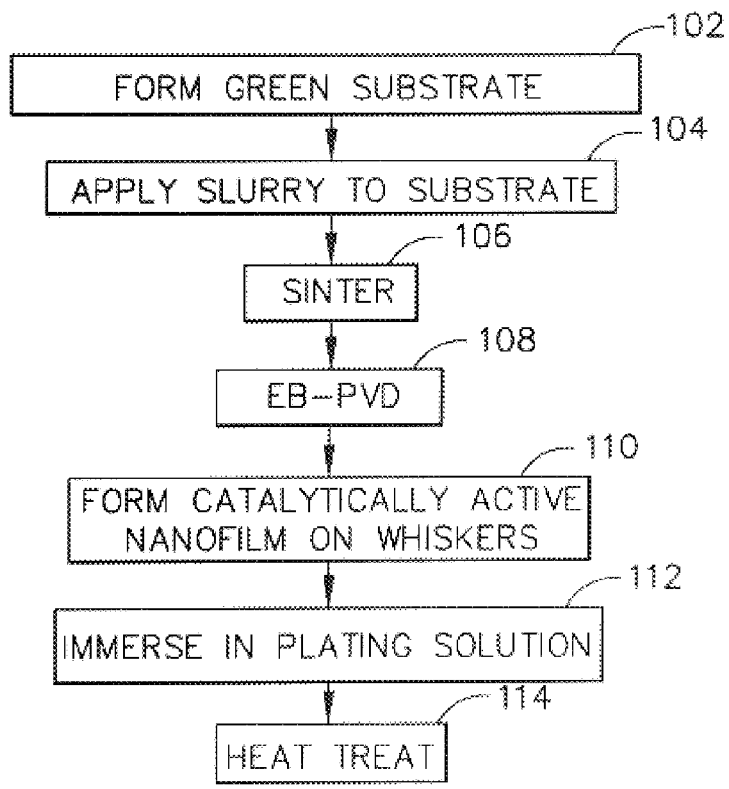
FIG. 4 is a flowchart of a method of forming a silicon nitride component in accordance with the present invention.

Reference is now made of FIG. 4, which illustrates a method of manufacturing a component in accordance with the present invention. Preferably, the substrate of the component is manufactured by a powder metallurgy process. Such a process includes forming green silicon nitride powder compacts of the substrate (step 102).

The porous silicon nitride matrix is grown in situ on the substrate as follows. An aqueous slurry containing 30% to 60% water is sprayed or brushed onto the green substrate (step 104). The slurry includes silicon nitride powder (e.g., alpha type) and sintering additives. The applied slurry has a lower density than the green substrate. The sintering additives control the amount of shrinkage of the matrix relative to the substrate. If the amount of the sintering additive in the slurry is excessive, the matrix will detach from the substrate. If the amount of sintering additive is insufficient, the matrix will not shrink a sufficient amount during sintering and will detach from substrate. The additives may include rare earth oxides, nitrides and oxides/nitrides of aluminum (Al), magnesium (Mg), strontium (Sr) or the like. Powders that serve to hinder sintering of silicon nitride, such as boron nitride (BN), may also be added to control the amount of shrinkage of the porous silicon nitride matrix. Preferably, the sintering additives are in the range of 2 to 20 wt % of the total powder.

After the slurry has been applied to the substrate, the green substrate and the applied slurry are sintered (step 106). Sintering may be performed at a temperature exceeding 1700° C. The sintering causes beta silicon nitride whiskers to grow and form a matrix on the substrate. Because of a combination of liquid and vapor phase transport mechanisms along with the open space defined on the surface of the substrate, the growth of the whiskers is fast and uninhabited. The sintering also increases the density of the substrate to greater than 90% of the theoretical density.

The refractory metal oxide may be applied to the silicon nitride whiskers by Electron Beam-Physical Vapor Deposition (EB-PVD) (step 108). During EB-PVD a high-energy electron beam is focused on an ingot of the material to be deposited (e.g., tantalum or tantalum oxide). The electron bombardment results in high local heating on the ingot, which evaporates at the atomic level and condenses on the silicon nitride whiskers. Oxygen is bled into the EB-PVD system during the evaporation of the pure refractory metal ingot or the refractory metal oxide ingot, to react with the vapor and form an oxide. A chemical bond is formed between the refractory metal oxide and the silicon nitride whiskers. The refractory metal oxide may instead be applied to the silicon nitride whiskers by a chemical vapor deposition (CVD).

The noble metal is infiltrated into the porous silicon nitride matrix and the top layer is formed by electroless autocatalytic plating (steps 110 to 114). A noble metal such as platinum may be deposited from a bath of ammonium hydroxide. Such a bath does not damage the silicon nitride.

For example, the surface of the refractory metal oxide is catalytically activated by immersion at room temperature for one to two minutes into a 10 g/L tin chloride solution and then into a 1 g/L palladium chloride solution with an intermediate and final water rinse (step 110). Resulting is a catalytically active, highly adherent palladium nanofilm having a thickness of a few nanometers. The nanofilm will be used to start up the electroless plating.

Sulfate, bromide, acetate or other salts of tin (Sn) or palladium (Pd) may be used. Salts of other noble metals (e.g., platinum, rhodium, iridium, gold, silver) may be used.

The substrate and matrix are immersed in a plating bath (step 112). Platinum may be electrolessly plated onto tantalum oxide as follows.

The plating bath includes a diammine salt ($Pt(NH_3)_2(NO_2)_2$) that provides platinum in a concentration range from about 0.01 g/L to about 300 g/L. The preferred concentration of the platinum is about 1 g/L.

The plating bath includes about 25% ammonium hydroxide solution ($NH_4OH$) having a concentration range of about 1 mL/L to about 1000 mL/L. The preferred concentration of the ammonium hydroxide solution is preferably about 50 mL/L.

The plating bath also includes hydrazine hydrate ($N_2H_4 \cdot H_2O$) having a concentration range of about 0.01 g/L to about 240 g/L. The preferred concentration of the hydrazine hydrate is preferably about 1 g/L.

The substrate is immersed in the plating bath until the platinum has reached a desirable thickness of about 1 micron to about 200 microns and preferably 5 microns to about 50 microns. The plating bath temperature is between about 15° C. to about 98° C. for a plating rate between about 0.1 micron/hr and 3 microns/hour. Preferably, the plating bath temperature is between about 80° C. and 85° C. for a plating rate of about 1 micron/hour.

The palladium nanofilm catalyzes the deposition of noble metal. The hydrazine hydrate reduces the platinum salt to metallic platinum on the surface of the tantalum oxide. As a result, a dense, uniform continuous, ultra pure metal can be deposited on a porous, geometrically complicated surface such as that of the silicon nitride whiskers.

The plating is preferably a substantially pure metal. That is, the plating is greater than 99 percent pure metal, and preferably, greater than 99.9 percent (metal basis). Some impurities of hydrogen ($H_2$), nitrogen ($N_2$) and water ($H_2O$) are acceptable, and mixtures of noble metals may be used.

A noble metal such as platinum may be post-heat treated to improve adhesion, purity and structure (step 114). For example, the platinum may be heated by a stream of air at about 600° C. for 0.5 to 1 hour.

This invention is further described, although not limited, by the following example.

EXAMPLE

A silicon nitride aqueous slurry slip was prepared by ball milling for 22 hours. The aqueous slurry included a silicon nitride composition consisting of 82 wt % $Si_3N_4$, 4 wt % $Y_2O_3$, 3 wt % $La_2O_3$, 1 wt % SrO and 10 wt % SiC. To improve the slip quality, 0.5% Darven C Standard slipcasting was performed using the slurry to form a green piece of about 2.2"×2.2"×0.7." A portion of the slurry was further diluted to 50%–60% solid loading by adding water, and the diluted slurry was applied by a commercial spray gun on the slipcast block. After the spray-coated block was dried, it was loaded onto a graphite crucible and sintered in a graphite furnace at a temperature of about 1850° C. for about two hours under 100 psi nitrogen, 1950° C. for about three hours under 170 psi nitrogen and about 2025° C. for about two hours under 400 psi nitrogen. After sintering, the block was at about 99.5% of its theoretical density, and a coherent top layer consisting of a layer of fibrous beta silicon nitride was formed.

The block was machined into coupons of about 2"×0.12"× 0.16" to undergo EB-PVD coating of tantalum oxide. The coupons were degreased and then loaded into an EB-PVD system. The coupons were mounted to have the coated silicon nitride interlayer facing a tantalum ingot where a tantalum vapor would be generated from bombardment by an electron beam. During the coating step, the coupons were heated to about 1000° C. to enhance bonding, and oxygen was bled into the system to form a tantalum oxide coating on the silicon nitride whiskers.

A coupon having silicon nitride whiskers and a tantalum oxide coating was immersed at room temperature for one to two minutes in a 10 g/L tin chloride solution, rinsed with water and immersed in an electroless platinum plating bath. The plating bath contained 1 g/L platinum as $Pt(NH_3)_2(NO_2)_2$ salt, 1 g/L $N_2H_3 \cdot H_2O$ and 50 mL/L 25% $NH_3OH$ at 80° C. to 85° C. for about seven hours. Thickness of the deposited platinum coating was about ten microns. A cross-section of the platinum plated ceramic coupon is shown in FIG. 3C. The platinum covered the porous silicon nitride layer with a dense, continuous layer, even in small voids. No etching of the porous silicon nitride layer by the platinum plating bath was observed.

Although the use of an electroless plating process by immersion of a substrate into a plating bath is preferred, other types of applications of the plating bath onto a substrate may be used. For example, a platinum plating solution may be sprayed or poured onto the porous silicon nitride matrix.

Turbine engine components other than blades, nozzles and rotors may be coated in accordance with the present invention. For example, turbine shrouds may be coated in accordance with the present invention.

Although the protective coating was described above in connection with components of a turbine engine, it is not so limited. The protective coating could be applied to any component that is used in a hostile environment.

Although the present invention has been described above with reference to specific embodiments, it is not so limited. Instead, the present invention is construed according to the claims that follow.

What is claimed is:

1. A protective coating for a silicon nitride substrate, the coating comprising:

a porous layer of silicon nitride whiskers on the silicon nitride substrate; and a noble metal infiltrating the porous silicon nitride layer, the noble metal having a purity of at least 99 percent.

2. The coating of claim 1, wherein purity of the noble metal is about 99.9 percent.

3. A method of applying a protective coating to a silicon nitride substrate, the method comprising:

forming a fibrous silicon nitride layer on the substrate; and infiltrating a noble metal into the fibrous silicon nitride layer by electroless plating.

4. The method of claim 3, wherein the electroless plating is performed by forming a catalytically active, noble metal nanofilm on surfaces of whiskers of the layer; and immersing the layer in an electroless plating bath.

5. The method of claim 4, wherein the electroless plating bath includes a diammine salt that provides platinum in a concentration range from about 0.01 g/L to about 300 g/L, about 25% ammonium hydroxide solution having a concentration range of about 1 mL/L to about 1000 mL/L, and hydrazine hydrate having a concentration range of about 0.01 g/L to about 240 g/L; and wherein plating bath temperature is between about 15° C. to about 98° C.

6. The method of claim 5, wherein the diammine salt provides platinum in a concentration range of about 1 g/L; wherein the ammonium hydroxide solution has a concentration range of about 50 mL/L; wherein the hydrazine hydrate has a concentration range of about 1 g/L; and wherein the plating bath temperature is between about 80° C. and 85° C.

* * * * *